Nov. 16, 1937.  T. J. O'CONNELL  2,099,276
EGG SEPARATOR
Filed June 11, 1936
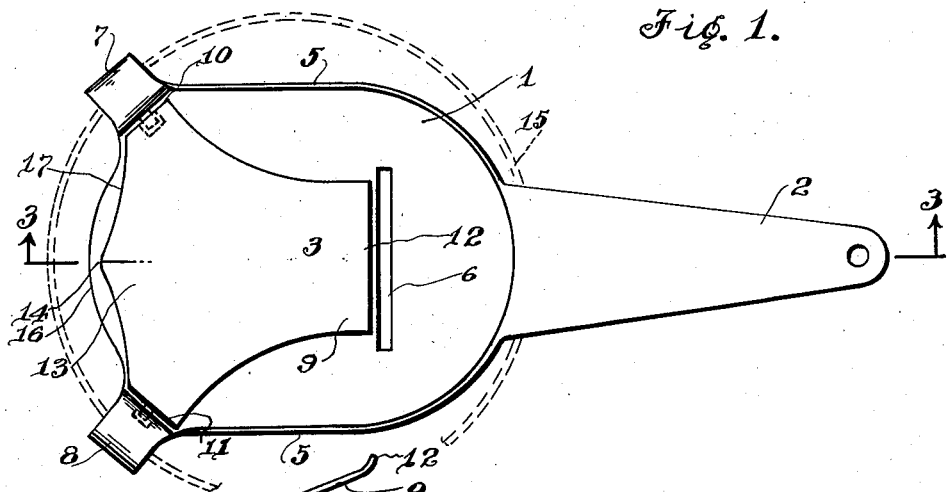
Fig. 1.
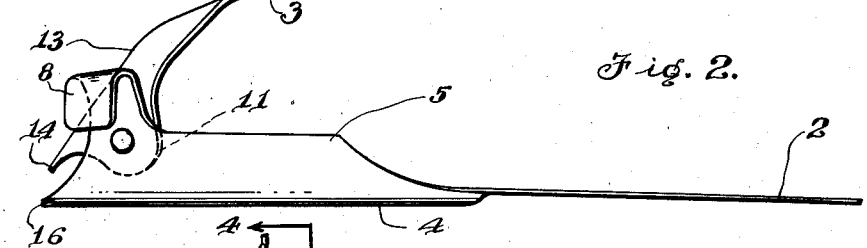
Fig. 2.
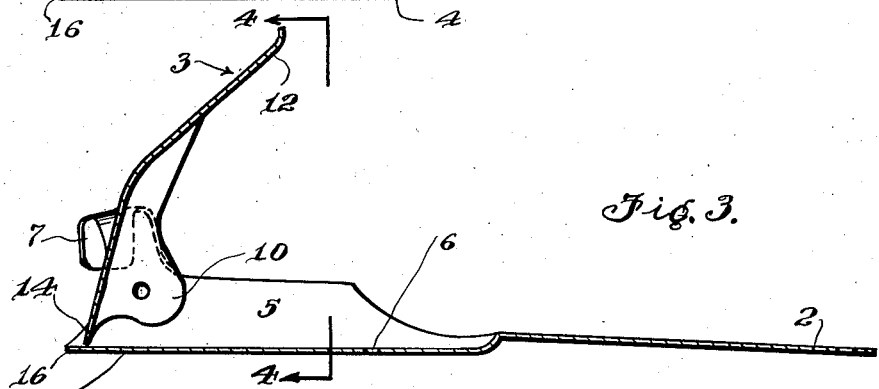
Fig. 3.
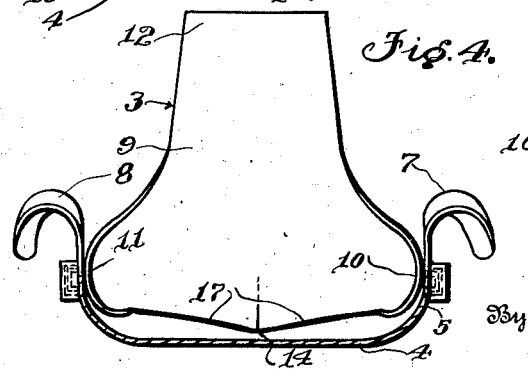
Fig. 4.
Fig. 5.
Inventor
Thomas J. O'Connell
By J. Kaplan
Attorney Patented Nov. 16, 1937

2,099,276

UNITED STATES PATENT OFFICE 2,099,276

EGG SEPARATOR

Thomas J. O'Connell, Flint, Mich., assignor of one-half to John W. Mestrezat, Flint, Mich.

Application June 11, 1936, Serial No. 84,749

3 Claims. (Cl. 146—2)

This invention relates to egg separators and more particularly to a device to separate the yolk from the white of an egg.

The main object of the invention is to provide a receptacle in the form of a spoon for holding the contents of an egg and means to separate the yolk from the white of the egg as the contents leave the spoon.

Another object of the invention is to provide hook means to rest the spoon on a cup or other vessel while operating the device.

A still further object of the invention is to provide a swinging gate device pivotally attached to the spoon for checking the flow of the yolk while allowing the white of the egg to run out.

Other objects will appear as the disclosure progresses. The drawing is intended to merely indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawing in which:

Figure 1 is a top view of the device.

Figure 2 is a side view thereof showing the check partly closed.

Figure 3 is a section on line 3—3 of Figure 1 but showing the check fully closed.

Figure 4 is a section on line 4—4 of Figure 3.

Figure 5 is a sectional detail of the pivoting mechanism.

Referring now to the drawing in detail, numeral 1 designates the body of the spoon, 2 the handle member extending from the front thereof and 3 the swinging check. The spoon is flat at the bottom as at 4 and is provided with upstanding sides 5. An elongated slot 6 is cut in the bottom as clearly seen in Figure 1. Protruding outwardly from the rear of the spoon are a pair of hooks 7 and 8. Pivoted to the sides of the spoon below the hooks by any suitable means is the swinging check 3. The check comprises a top member 9 having downwardly bent flaps 10 and 11 which lie within the adjacent sides 5 of the spoon. The front portion 12 of the check is preferably narrowed while the rear 13 is widened and provided with protruding portion 14.

In operation the spoon is placed over the edge of a cup 15 with the hooks 7 and 8 and a part of the handle member resting on the edge thereof as shown in dotted lines in Figure 1, and the rear of the check moved down as shown in Figure 3. The entire contents of a broken egg is then poured into the spoon. The white of the egg will drop out through the slot 6 or over the rear edge 16 while the yolk of the egg will be retained by the check. As noted in Figure 1 the rear of the check is provided with a protruding curved portion 14 which acts as a stop when the rear of the check is moved down so as to bear against the bottom of the spoon and thereby prevent the yolk from leaving the spoon and at the same time allow the white of the egg to leave the spoon underneath the concave edges 17 of the check.

After the entire white of the egg has left the spoon, the rear of the check is moved up substantially as shown in Figure 2 so the yolk can be poured over the edge of the spoon.

It will thus be seen that I have provided a simple, efficient and useful household utensil for separating the yolk from the white of an egg. The device comprises only one moving part and can be produced at a relatively low cost.

Having described my invention, I claim:

1. In a device of the class described, a spoon for separating the white from the yolk of an egg comprising a receptacle provided with upstanding sides and a discharge mouth, a hook member protruding upwardly from each of said sides, and a check means for retaining the yolk of the egg while the white is being discharged, said check being pivoted to said receptacle adjacent the discharge end thereof.

2. In a device of the class described, a spoon for separating the white from the yolk of an egg comprising a receptacle provided with upstanding sides and a discharge mouth, said receptacle having a slot in the bottom thereof, a handle member extending outwardly from one end of the spoon, a hook member protruding upwardly from each of said sides for engaging the edge of a cup, and a check means for retaining the yolk of an egg while the white is being discharged, said check being pivoted to said receptacle adjacent the discharge end thereof.

3. In a device of the class described, a spoon for separating the white from the yolk of an egg, comprising a shallow receptacle having side walls and a discharge mouth, said receptacle having a slot in the bottom thereof of a width sufficient to pass the white of an egg but narrow enough to prevent the passage of the yolk, said side walls having integrally formed hooks adjacent the discharge end for supporting said spoon over a yolk receiving receptacle, and a gate member pivoted adjacent the discharge end for controlling the flow of the white of the egg from the spoon while retaining the yolk therein.

THOMAS J. O'CONNELL.